US009172849B2

(12) United States Patent
Blonde et al.

(10) Patent No.: US 9,172,849 B2
(45) Date of Patent: Oct. 27, 2015

(54) METHOD AND APPARATUS FOR COLOR TRANSFORMATION BY ADDRESSING A LOOK-UP TABLE

(75) Inventors: Laurent Blonde, Thorigne Fouillard (FR); Didier Doyen, La Bouexiere (FR); Jürgen Stauder, Montreuil S/Ille (FR)

(73) Assignee: Thomson Licensing (FR)

( * ) Notice: Subject to any disclaimer, the term of this patent is extended or adjusted under 35 U.S.C. 154(b) by 848 days.

(21) Appl. No.: 11/447,432

(22) Filed: Jun. 6, 2006

(65) Prior Publication Data
US 2006/0279755 A1 Dec. 14, 2006

(30) Foreign Application Priority Data
Jun. 13, 2005 (EP) .................................... 05300475

(51) Int. Cl.
G06F 15/00 (2006.01)
H04N 1/60 (2006.01)
(52) U.S. Cl.
CPC .................................. H04N 1/6052 (2013.01)
(58) Field of Classification Search
USPC ................................................. 358/1.9, 3.23
See application file for complete search history.

(56) References Cited

U.S. PATENT DOCUMENTS

| 4,975,769 A | 12/1990 | Aizu et al. |
| 5,420,965 A * | 5/1995 | Barker, III .................. 358/1.15 |
| 5,450,500 A | 9/1995 | Brett |
| 5,528,741 A | 6/1996 | Lucas et al. |
| 5,596,510 A | 1/1997 | Boenke |
| 5,604,610 A | 2/1997 | Spauling et al. |
| 5,646,750 A | 7/1997 | Collier |
| 5,715,376 A * | 2/1998 | Nakayama .................... 358/1.9 |
| 5,754,184 A | 5/1998 | Ring et al. |
| 5,896,122 A | 4/1999 | MacDonald et al. |
| 6,025,885 A | 2/2000 | Deter |
| 6,366,319 B1 | 4/2002 | Bills |
| 6,552,751 B1 | 4/2003 | Shigeta |
| 6,778,216 B1 | 8/2004 | Lin |
| 2002/0001407 A1 | 1/2002 | Uhida |

(Continued)

FOREIGN PATENT DOCUMENTS

| CA | 2431149 | 12/2003 |
| DE | 19506595 | 2/1996 |

(Continued)

OTHER PUBLICATIONS

European Search Report dated Sep. 20, 2005.

(Continued)

*Primary Examiner* — Jeremiah Bryar
(74) *Attorney, Agent, or Firm* — Jack Schwartz & Associates, PLLC

(57) ABSTRACT

A method for image processing of digital image pixels. Pixels are preferably filtered spatially and dithered, and the value for at least one color component is bit reduced. The space freed by the bit reduction is used to allocate a look-up table selection bit that indicates which look-up table (LUT), from a plurality of small LUTs partitioned from a bigger LUT, should be used for the color transform. The transformed pixels are then selected according to the used LUT, format converted and output. The invention, which also covers an apparatus and a pre-processing module, enables an apparatus with a LUT to be used both as a single full-rate LUT apparatus and as a lower-rate n smaller LUT apparatus.

6 Claims, 2 Drawing Sheets

(56) References Cited

U.S. PATENT DOCUMENTS

| | | | |
|---|---|---|---|
| 2002/0003630 A1 | 1/2002 | Matama | |
| 2004/0013296 A1 | 1/2004 | Aotsuka | |
| 2004/0021882 A1* | 2/2004 | Kakutani | 358/1.9 |
| 2004/0170317 A1 | 9/2004 | Pettigrew et al. | |

FOREIGN PATENT DOCUMENTS

| | | |
|---|---|---|
| EP | 0 497 466 A1 | 8/1992 |
| EP | 1102477 | 5/2001 |
| EP | 1 239 668 A1 | 9/2002 |
| GB | 2278514 | 6/1994 |
| GB | 2300538 | 11/1996 |
| GB | 2402567 | 12/2004 |
| JP | 1125233 | 5/1989 |
| JP | 4352288 | 12/1992 |
| JP | 865696 | 3/1996 |
| JP | 8161468 | 6/1996 |
| JP | 8265584 | 10/1996 |
| JP | 9166971 | 6/1997 |
| JP | 10210311 | 8/1998 |
| JP | 10276322 | 10/1998 |
| JP | 2000316172 | 11/2000 |
| JP | 2001154282 | 6/2001 |
| JP | 2001171182 | 6/2001 |
| JP | 2002140700 | 5/2002 |
| JP | 2004271778 | 9/2004 |
| WO | WO0004492 | 1/2000 |
| WO | WO0167778 | 9/2001 |
| WO | WO03000362 | 1/2003 |

OTHER PUBLICATIONS

Judd, I. D. et al., "Multple Pseudo Color Lookup Tables in Raster Graphic and Image Displays", IBM Technical Disclosure Bulletin, vol. 26, No. 7A, Dec. 1, 1983, pp. 3409-3418.

* cited by examiner

METHOD AND APPARATUS FOR COLOR TRANSFORMATION BY ADDRESSING A LOOK-UP TABLE

This application claims the benefit, under 35 U.S.C. §119 of European Patent Application 05300475.0, filed Jun. 13, 2005.

FIELD OF THE INVENTION

The present invention relates generally to image processing, and in particular to colour processing.

BACKGROUND OF THE INVENTION

Despite the best efforts, colours are not always rendered in the same way on different display media, such as a television, a computer monitor or a cinema screen. In fact, even within a particular media, there may be visible differences, such as between plasma television sets and rear projection television sets, or between different television systems or video systems.

These differences are naturally not desired by, primarily, the film and television industry, where it is desired to ensure that e.g. a film looks the same regardless of the media used for the display.

At this point, it should be pointed out that while there are several neighbouring problems—the format of the screen, the resolution of images, the rendering of the colours—the present invention is concerned with the colour problem.

A known solution to this problem, known from e.g. U.S. Pat. No. 5,604,610, uses colour processing repeatedly to produce a plurality of versions of the film, each version adapted to render colours correctly on a particular medium or media. For example, one version may be intended for cinema projection, a second for NTSC (National Television System Committee) television, and a third one for French SECAM (Séquentiel Couleur Avec Mémoire) television.

Due to the trichromatic characteristics of the human vision, colour processing most of the time uses colour triplets in various colour spaces. A basic one is RBG (for Red, Green, Blue) representing colour for TV or PC monitors. Other device dependent or device independent representations exist such as XYZ from the International Commission on Illumination (CIE).

In its strict sense—i.e. considering only colour levels and not spatial processing—colour processing realizes a colour transform for each pixel of an image, such as one film frame, or more generally for each pixel of a pixel stream.

If a, b and c are three components of an input colour triplet and a', b', c' are the three components of the corresponding output triplet, the colour transform can be defined by:

$$(a', b', c') = f(a, b, c) \Leftrightarrow \begin{cases} a' = f_a(a, b, c) \\ b' = f_b(a, b, c) \\ c' = f_c(a, b, c) \end{cases}$$

While any type of colour transform can be realized in software, recent hardware developments provide hardware platforms—in the description called "colour boxes"—able to perform real-time colour transforms on high bandwidth signals such as the 2K or 4K data formats of Digital Intermediates (digital film processing). 2K corresponds to 2048×1556 colour pixels per frame at a 24 frames per second frame rate with 10 bits per colour, while 4K corresponds to four times of that (4096×3112 colour pixels).

It should be noted, however, that present day colour boxes often do not have full sets of conversion values, but that they rely on e.g. 16×16×16 control points (corresponding to 4 bit) that are expanded by tetrahedral interpolation.

It should also be noted that colour boxes may also be used to "colour grade" film sequences according to the intent of a colour grader or of the director of photography. An example is a science fiction film that takes place on a planet with a red sun. Outdoor sequences for that film could be shot in normal sunlight and processed later to make everything have a reddish tinge.

However, a problem with present day colour boxes is that they only can be used for one purpose at a given time. If a colouring artist working on his own display wishes to verify what the result looks like on the big screen, he has to load the new transform parameters into the colour box (which may take 10 seconds or more), see if it is okay, and if this is not the case, reload the original transform parameters, make a change and so on. Similarly, it is not possible to simultaneously process a plurality of versions of a scene; the colouring artist first has to work on one version before changing parameters and turning to the next.

U.S. Pat. No. 5,596,510 teaches a system for colour transformation using three look-up tables. However, the look-up tables in question—a sampled look-up table, a delta look-up table, and a restriction table—are used in series, i.e. each table is used to provide a value that is combined with the other, values to provide final transformed colour value. It will be appreciated that this does not increase the flexibility of the system as desired.

It can therefore be appreciated that there is a need for a multi-purpose apparatus for colour processor. This invention provides such a colour processor.

SUMMARY OF THE INVENTION

In a first aspect, the invention is directed to a method for image processing of digital image pixels for which each colour component is represented by a value. For each pixel, the colour of the pixel is transformed using one of a plurality of look-up tables, the look-up table to use for the pixel being indicated by at least one look-up table selection bit comprised in at least one colour component value.

In a preferred embodiment, at least one look-up table selection bit is allocated to at least one bit of at least one colour component value.

It is advantageous that the number of bits for the representation of at least one of the colours is reduced to make space for the at least one look-up table selection bit.

In another preferred embodiment, the pixels are sorted according to the look-up table used during the transforming step.

In a further preferred embodiment, a look-up table is first partitioned into the plurality of look-up tables.

In a second aspect, the invention is directed to an apparatus for colour processing of digital image pixels for which each colour component is represented by a value. The apparatus comprises a colour box that comprises a look-up table (LUT) adapted to transform the colour component values of a pixel. The look-up table is adapted to be partitioned into a plurality of smaller look-up tables, and the apparatus comprises a module for allocating at least one look-up table selection bit comprised in at least one colour component value, the lookup table selection bit indicating which of the plurality of smaller look-up tables should be used for transformation of the colour component values.

In a preferred embodiment, the apparatus further comprises a module for reducing the number of bits for the representation of at least one of the colour component values to make space for the at least one look-up table selection bit.

In another preferred embodiment, the apparatus further comprises a module for sorting pixels according to the smaller look-up table used for the transformation.

In a third aspect, the invention is directed to a pre-processing module adapted to process a signal for subsequent use by an apparatus comprising a look-up table adapted to be partitioned into a plurality of smaller look-up tables, the apparatus being for colour processing of digital image pixels for which each colour component is represented by a value. The pre-processing module comprises a component adapted to allocate at least one look-up table selection bit comprised in at least one colour component value, the look-up table selection bit indicating which of the plurality of smaller look-up tables the apparatus should use for transformation of the colour component values.

In a preferred embodiment, the pre-processing module further comprises a module for reducing the number of bits for the representation of at least one of the colour component values to make space for the at least one look-up table selection bit.

BRIEF DESCRIPTION OF THE DRAWINGS

Preferred features of the present invention will now be described, by way of example, with reference to the accompanying drawings, in which.

DETAILED DESCRIPTION OF PREFERRED EMBODIMENTS

Figure 1:
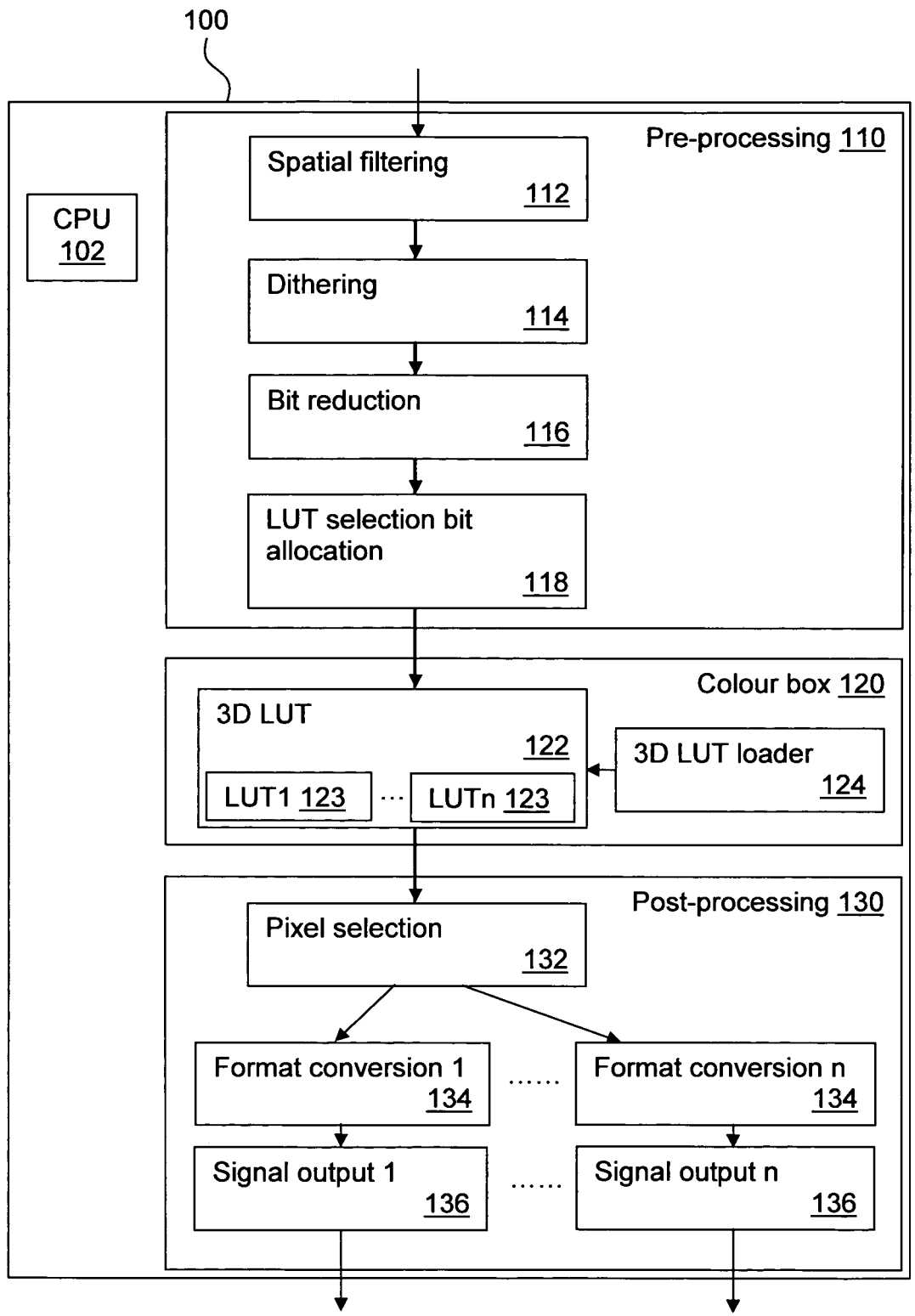
FIG. 1 is a schematic block chart illustrating the apparatus according to a preferred embodiment of the invention.

The basic idea of the invention is to program a colour box to store several 3D LUTs (Look-Up Tables) and to modify the input data in order to access separately these LUTs.

As will be explained in greater detail hereinafter, this may be done by reducing by 1 bit the number of bits allocated to the representation of one of the colours, i.e. the signal is re-mapped from n bits to n−1 bits for this colour.

If l, m and n respectively are the number of bits used to code the first, second and third component of the colour signal, then l×m×(n−1) address spaces are necessary instead of l×m×n for one colour transform. This allows the partition of the colour box into two zones, with two different colour transforms, each of size l×m×(n−1). The freed bit may then be used to select one or the other zone, as desired.

As a very simple example, consider a colour (RGB) signal where each colour is given by 4 bits, i.e. each colour component can vary from 0 to 15. The address space needed is thus l×m×n→4+4+4 bits=12 bits. Output space is usually of the same size as the input space, i.e. 12 bit.

Before feeding the signal to the colour box, the bit resolution of the third channel (e.g. B) is reduced by 1. B values are then coded from 0 to 7 over 3 bits—e.g. by dividing the previous values by 2). The fourth bit—which will be called the LUT selection bit—is used to indicate which LUT should be used by the colour box.

Now, two independent LUTs are defined in two different memory zones of the original LUT of the colour box:
LUT 1: 0≤R≤15, 0≤G≤15, 0≤B≤7
LUT 2: 0≤R≤15, 0≤G≤15, 8≤B≤15

Each LUT has an output on 4+4+4 bits—4 bits are used for the third colour even though the value is limited to three bits. Using the LUT selection bit, LUT 1 or LUT 2 can be chosen. If LUT 1 is chosen (the LUT selection bit is 0), the B value is between 0 and 7, but if LUT 2 is chosen (the LUT selection bit is 1), then the B value is between 8 and 15. There is not necessarily any change in output colour space, which may keep 12 bits. If for example the LUT selection bit flips between 0 and 1 for each new sample, and the output is sorted, this creates two signals at half rate, each one with its own colour LUT characteristics. To convert the half rate signals back to full rate there are several possibilities. A first option is to double the rate before LUT application, which results in two full rate signals. A second option is to interpolate the two resulting half rate signals to two full rate signals. Other options are possible. If for example the colour box comprises more than two LUTs, the two described options may be combined.

The LUT selection can however also depend on the line parity of the input signal or other fixed, image-independent selection criteria.

Naturally, losing bit precision decreases the "granularity" of the colour spectrum, but this is of no importance for certain display devices if the input granularity is higher than that used in those devices. Furthermore, the human eye is limited when it comes to discerning colours and is usually unable distinguish between neighbouring colours rendered by 10 bits or more, so as long as the output signal uses 10 bits to represent each colour, the human eye will often not notice that the colour quality has diminished. However, the reduced precision may cause artefacts, which preferably should be attenuated using spatial and/or temporal dithering in the pre-processing. This technique, well-known in the personal computer domain to compensate the lack of resolution for some of the graphic cards, often reduces the visual impact of artefacts caused by the bit loss.

It should be noted that this basic approach is valid for a full resolution colour box, i.e. a colour box that uses l×m×n LUT entries for l×m×n input signal values. If the 3D LUT is defined by less than l×m×n entries (called control points) and complementary interpolation is used, special care must be taken when splitting the 3D LUT in two. Complementary interpolation expands a LUT of reduced number of entries to full precision. The interpolation does of course not compensate for the loss of information, but reduces the visibility of reduced "granularity" significantly.

For example, the range of values is preferably limited, with defined lower and upper limits to avoid border effects that could be caused by the 3D LUT interpolation. The following example explains this case: a colour box allowing for 10 bit (1024 levels) signal processing, usually using a LUT with 256×256×256 entries and linear interpolation between the entries is used to process two signals by two different LUTs. These signals have a reduced resolution of 9 bits for at least in one colour component. Of course, the two 9 bits signals may be identical, depending on the application. The 256×256×256 LUT is composed of two 256×256×128 LUTs, for one each of the signals. Since the interpolation process of the colour box is not changed, it should be ensured that all entries used for interpolation belong to the same 256×256×128 LUT. One solution is to limit the 9 bit signal to 0 and 508 for the lower LUT and between 512 and 1024 for the higher LUT. If this is not done, interpolated values between 508 (lower LUT 1) and 512 (higher LUT 2) have no meaning, as that particular area is undefined—i.e. there is no way to interpolate between the highest colour value of the lower LUT and the lowest colour value of the higher LUT.

FIG. 1 is a schematic block chart illustrating an apparatus—a colour processor—according to a preferred embodiment of the invention. The colour processor 100 comprises a processor (CPU) 102 adapted to control the colour processor, and three modules: a pre-processing module 110, a colour box module 120, and a post-processing module 130. As is indicated by their names, the pre-processing module 110 prepares the signal for the colour box 120, while the post-processing module 130 treats the output from the latter.

The pre-processing module 110 preferably comprises the following components: a spatial filtering component 112, a dithering component 114, a bit reduction component 116, and a LUT selection bit allocation component 118.

The spatial filtering component 112 is adapted to prepare the signal for the future spatial sub-sampling by 2. This element may include line delays and multiplicative/additive filters in the two spatial directions.

The dithering component 114 adds a spatially variable component to one or more of the colour signals to compensate by spatial integration for the future bit loss. In practice, the dithering consists of defining pseudo-random information which is added to the full resolution input signal. The information allows the output signal—after bit reduction of the input signal and the rounding operation—to have globally the same average value as the input signal. The dithering may be either spatial or spatio-temporal. In spatial dithering, the pseudo-random information depends only on its spatial location, but in spatio-temporal dithering, it also depends on its temporal location. In both cases, the processing is based on counters (pixel, line and frames) and on adders to add this information to the video input signal.

The bit reduction component 116 allows the mapping of the initial n-bit signal for one or more colour components to n−1 or less bits. Although a simple bit shift (division by 2) may be sufficient, a more elaborated mapping is preferred due to some colour box constraints as explained hereinbefore to avoid border effects.

The LUT selection bit allocation component 118 sets the at least one LUT selection bit to 1 or 0 for each incoming pixel. This selects the LUT that is to process the pixel, making it pass through one of the available 3D-LUTs. This bit allocation is preferably done in a determined sequence and with a given synchronization for the post-processing module 130 to be able to sort out the processed pixels.

When the apparatus is used to provide n different output pixels, the original pixel is preferably input n times to the pre-processing module 110, for pre-processing and setting of the LUT selection bit.

The colour box 120 comprises a 3D-LUT 122 and a 3D-LUT loader 124. The 3D-LUT 122 is adapted to transform a colour value from the pre-processing module 110 to an outgoing colour value according to the values in the look-up table. Logically, the 3D-LUT 122 may comprise n smaller LUTs 123, LUT 1 to LUTn, but it should be understood that these smaller LUTs 123 are partitions of the "big" LUT 122 as explained herein. The 3D-LUT loader 124 loads the required values of the control nodes into the LUT 122, and potentially also more parameters of the colour box like signal rate and bypass mode for example.

The post-processing module 130 comprises a pixel selection component 132, n format conversion components 134, and n signal output components 136.

The pixel sorting component 132 is adapted to sort the pixels processed by, and received from, the colour box 120. There are two possibilities: the LUT selection bits are kept during the colour box traversal (e.g. 9×10×9-to-9×10×9) or they are not kept (e.g. 9×10×9-to-10×10×10 transform). In the first case, the pixel selection component 132 may use the LUT selection bits to sort the pixels from the colour box 120. In the second case, the pixel sorting component 132 needs to be synchronized with the LUT selection bit allocation component 118 to sort the pixels; this can allow a colour randomization that potentially may replace the dithering.

The format conversion components 134 then preferably perform spatial as well as bit depth conversions respectively on the sorted pixels to adapt them to the target format. The signal output components 136 then generate the necessary channels and synchronization signals and output them in accordance to the defined electrical and physical (connector) specifications.

It should be noted that the colour processor may also be used as a "classic" colour box, i.e. with a single output and no bit reduction. In this case, the pre-processing module 110 is transparent, the colour box 120 transforms the colours according to the prior art, and only the signal output component 136 is active in the post-processing module 130. It should also be noted that the pre-processing module 110 may be a stand-alone unit, separate from the rest of the colour processor.

Preferably, the choice of mode, "classic" or 1-to-n transform, is given by the user and depends on the application. Looking at the example of a postproduction workflow consisting of a first step and a second step, different decisions can be taken. For the first step—consisting of some basic image processing operation giving a raw result—the 1-to-n transform may be chosen to generate n signals for n different displays but in reduced precision. For the second step—consisting in final operations and giving the final result—the classic transform may be chosen, giving a full precision signal for a single, but most important display.

Using the invention, the colour processor 100 may be adapted to partition the colour box 120 into four 3D-LUTs 123, resulting in a division by four of the image format (2 in each direction). This allows the generation of four 2K signals (e.g. HDTV) from a 4K signal, or of four 1024×778 signals (like SDTV) from a 2K signal.

While the master signal (e.g. 4K or 2K) is used for the main colour processing, the down-sampled signals can be used for the simultaneous visualization of the sequence on various devices, such as for example a computer monitor (usually with only 8 bits bit colour depth), a TV or HDTV monitor (with 10 bits bit depth), and a digital projector for preview purposes.

A typical application is to use the lower resolution output signals to generate a lower resolution proxy version of the main signal for later use. Another typical application is to use them as a preview of graded versions specifically processed for DVD, TV or HDTV release. The lower resolution output signals may be used as a final result (for instance in case of TV) or used only for preview during a post-production operation and later generated in full resolution.

As described hereinbefore, one or more colours must be bit-reduced to allow partitioning of the colour box. It is preferred to reduce first the number of bits for the colours that have less impact on the visual quality than the other colours. For example, Green contributes the most to the luminance, so it is preferred to reduce Blue and Red first. For the choice between Red and Blue, it is preferred to reduce Blue, as Red is used for skin tones, to which the human eye is very sensitive. Naturally, if for example the colour is given by 10 bits in the input signal and the output signal is destined for a computer monitor that only uses 8 bits, the choice of colour to reduce is practically arbitrary. In the case of other colour spaces, corresponding choices have to be taken; for example, in XYZ space, Z is preferred, and then X.

Figure 2:
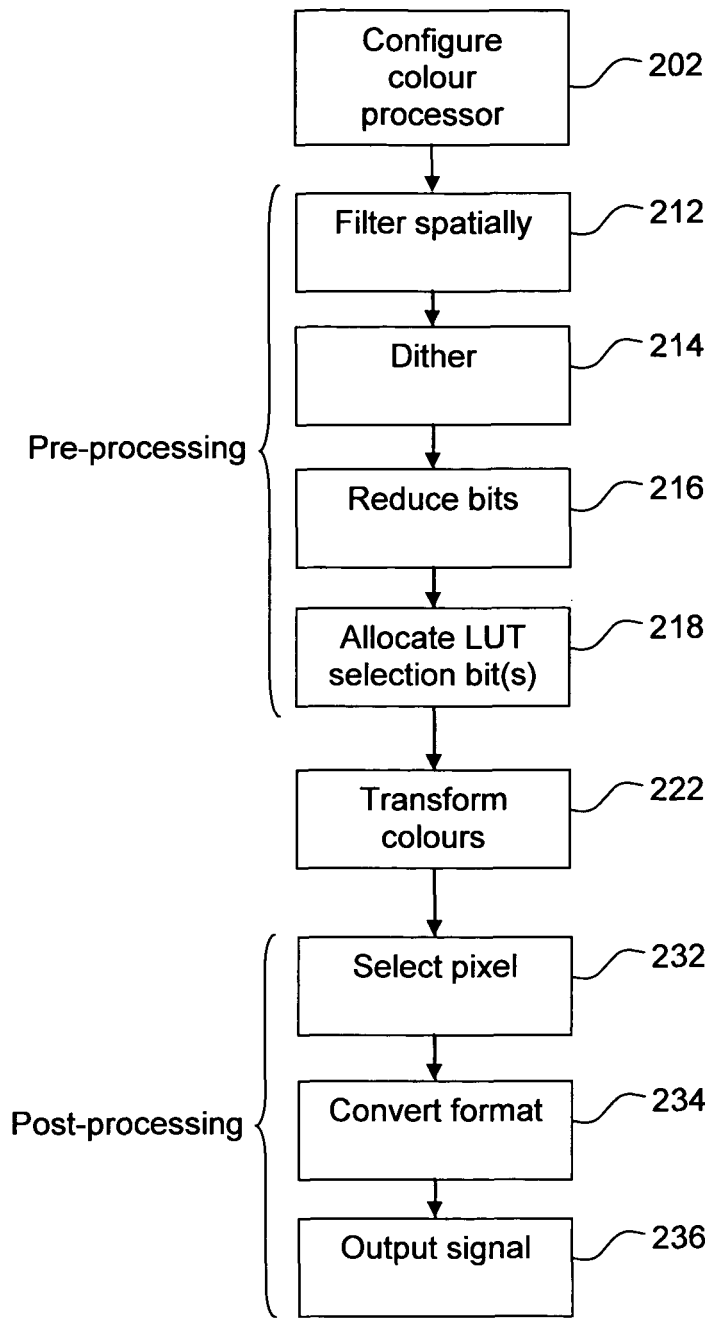
FIG. 2 illustrates a flow chart of a preferred embodiment of the method according to the invention.

A method for processing colours according to the invention will now be described with reference to FIG. 2. In step 202, the colour processor is configured to ensure proper working by for example:

defining the spatial filtering to be used, if any (spatial filtering component 112);
defining the dithering to be used, if any (dithering component 114);
selecting by how many bits each colour should be reduced (dithering component 114, bit reduction component 116 and LUT selection bit allocation component 118);
loading the one or more LUTs (3D LUT component 122);
defining the pixel sorting, if any (pixel sorting component 132 and possibly LUT selection bit allocation component 118);
setting the format conversion, if any (format conversion component 134);
defining the output (signal output component 136 and possibly pixel sorting component 132).

If the colour processor 100 is to be used as a classical colour box, then, as described hereinbefore, only the transform colour step (222) and the output signal step (236) are necessary, although other steps described hereinafter may still be used. Hereinafter, where not otherwise indicated or implicit, the 1-to-n transform method is described in its preferred embodiment.

In step 212, the input signal is filtered spatially to prepare the signal for the future spatial sub-sampling by 2, as described hereinbefore. A spatially variable component is added, in step 214, to one or more of the colour signals to compensate by spatial integration for the future bit loss, as described hereinbefore. The initial n-bit signal is mapped to n−1 bits (or indeed n−x, where 1≤x≤n) for one or more colours in step 216, as described hereinbefore. The pre-processing then ends in step 218 by the setting of at least one LUT selection bit for each incoming pixel, preferably with attention to synchronisation with the pixel sorting component 132, as described hereinbefore.

In step 222, each colour value from the pre-processing module 110 is transformed to an outgoing colour value according to the values in the 3D-LUTs 123.

In step 232, the transformed pixels are selected. If the LUT selection bits are kept during the colour box traversal, then the pixel sorting is preferably based on the LUT selection bit to ensure that pixels from the same transform are forwarded to the same format conversion component 134. However, if the LUT selection bits are not kept, the pixel sorting should be synchronised with the allocation of LUT selection bit(s) in order to forward the pixels to the correct format conversion unit 134, which potentially may replace the dithering.

The format is then converted in step 234 to adapt the pixels to the target format, and the signal is output in step 236, as described hereinbefore.

It can thus be appreciated that the present invention improves upon the prior art by providing a colour processor that may be used to provide a 1-to-N transform or a 1-to-1 transform.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

Reference numerals appearing in the claims are by way of illustration only and shall have no limiting effect on the scope of the claims.

What is claimed is:

1. A method for processing colour components of digital image pixels for which each colour component is represented by a value, the method comprising, for each pixel:
    reducing a number N of bits allocated to defining the colour component value of at least one of the colour components by at least one bit from N bits to N−1 or less bits to free at least one bit for allocation of an at least one look-up table selection bit;
    allocating the at least one look-up table selection bit to the at least one bit freed by the reduction of the number of bits allocated to the definition of the at least one colour component value;
    setting the at least one look-up table selection bit to a value indicating a selected look-up table from among a plurality of look-up tables, to use to transform the colour component values of the pixel, wherein each look-up table of the plurality of look-up tables respectively corresponds to a different colour transformation algorithm of a plurality of colour transformation algorithms; and
    transforming colour component values of a pixel including the at least one reduced colour component value using the selected look-up table in order to change the physical appearance of the pixel.

2. The method of claim 1, further comprising, after transforming the colour component values, sorting the pixels according to the look-up table used during the transforming step.

3. The method of claim 1, further comprising obtaining the plurality of look-up tables by partitioning a look-up table.

4. An apparatus for processing colour components of digital image pixels for which each colour component is represented by a value, the apparatus comprising:
    a colour box comprising a look-up table adapted to transform the colour component values of a pixel, wherein the look-up table is adapted to be partitioned into a plurality of smaller look-up tables, wherein each look-up table of the plurality of smaller look-up tables respectively corresponds to a different colour transformation algorithm of a plurality of colour transformation algorithms; and
    a pre-processing module comprising:
        bit reduction component configured to reduce a number N of bits allocated to defining the colour component value of at least one of the colour components by at least one bit to N−1 or less bits to free at least one bit for allocation of an at least one look-up table selection bit; and
        a look-up table selection bit allocation component configured to allocate the at least one look-up table selection bit to the at least one freed bit, and to set the at least one look-up table selection bit to a value indicating a selected look-up table from among the plurality of smaller look-up tables, to use to transform the colour components of the pixel including the at least one reduced colour component value.

5. The apparatus of claim 4, further comprising a sorting module that sorts pixels according to the smaller look-up table used for the transformation.

6. A pre-processing module adapted to process a signal for subsequent use by an apparatus comprising a look-up table adapted to be partitioned into a plurality of smaller look-up tables, the apparatus for colour processing of colour components of digital image pixels for which each colour component is represented by a value, the pre-processing module comprising:
  a bit reduction component configured to reduce a number N of bits allocated to define the colour component value of at least one of the colour components by at least one bit to N−1 or less bits to free at least one bit for allocation of an at least one look-up table selection bit;
  a look-up table selection bit allocation component configured to allocate the at least one look-up table selection bit to the at least one freed bit and to set the at least one look-up table selection bit to a value indicating a selection look-up table from a plurality of smaller look-up tables to be used by the apparatus for transformation of the colour component values including the reduced colour component value, wherein each look-up table of the plurality of look-up tables respectively corresponds to a different colour transformation algorithm of a plurality of colour transformation algorithms.

* * * * *